United States Patent
Vilke et al.

(10) Patent No.: US 11,016,653 B2
(45) Date of Patent: *May 25, 2021

(54) METHODS AND SYSTEM FOR LOCALLY GENERATED GESTURE AND TRANSITION GRAPHICS INTERACTION WITH TERMINAL CONTROL SERVICES

(71) Applicant: Citrix Systems, Inc., Fort Lauderdale, FL (US)

(72) Inventors: Stephen D. Vilke, Danville, CA (US); Paul Hinks, Larkspur, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,576

(22) Filed: Jul. 12, 2019

(65) Prior Publication Data

US 2019/0332238 A1 Oct. 31, 2019

Related U.S. Application Data

(63) Continuation of application No. 13/492,803, filed on Jun. 9, 2012, now Pat. No. 10,353,563, which is a
(Continued)

(51) Int. Cl.
*G06F 3/00* (2006.01)
*G06F 3/033* (2013.01)
(Continued)

(52) U.S. Cl.
CPC .......... *G06F 3/0485* (2013.01); *G06F 3/0487* (2013.01); *G06F 9/452* (2018.02)

(58) Field of Classification Search
CPC .... G06F 3/0485; G06F 9/452; G06F 3/04883; G06F 3/0482; H04L 43/04; H04L 67/025
(Continued)

(56) References Cited

U.S. PATENT DOCUMENTS 6,057,845 A  5/2000 Dupouy
7,173,604 B2  2/2007 Marvit et al.
(Continued)

FOREIGN PATENT DOCUMENTS

WO  WO-2010/120584 A1  10/2010
WO  WO-2010/120586 A1  10/2010

OTHER PUBLICATIONS

Examination Report for EP Appl. No. 12796423.7, dated Aug. 14, 2018.
(Continued)

*Primary Examiner* — Manglesh M Patel
(74) *Attorney, Agent, or Firm* — Foley & Lardner LLP

(57) ABSTRACT

Methods and system for enabling locally generated transition graphics interaction with virtualized host computer service includes receiving a control command issued by a user to control screen data currently being rendered at the display device, at a display device of a client device. The control command is transmitted to the host computer service for processing. The host computer service processes the control command and returns updated screen data to the client device. In response to the receipt of the updated screen data, the client device identifies a desired screen effect associated with the control command. The updated screen data received from the host computer service is packaged at the client device with data associated with the desired screen effect to generate a visual response at the client device. The packaged screen effect is returned to the display device for rendering, in response to the control command.

20 Claims, 6 Drawing Sheets

Related U.S. Application Data continuation of application No. PCT/US2012/041772, filed on Jun. 8, 2012.

(60) Provisional application No. 61/494,862, filed on Jun. 8, 2011.

(51) Int. Cl.
| | |
|---|---|
| *G06F 3/0485* | (2013.01) |
| *G06F 3/0487* | (2013.01) |
| *G06F 9/451* | (2018.01) |

(58) Field of Classification Search
USPC .................. 715/740, 863, 200, 738, 726
See application file for complete search history.

(56) References Cited

U.S. PATENT DOCUMENTS

| | | | |
|---|---|---|---|
| 7,337,404 | B2 | 2/2008 | Rollins |
| 7,747,086 | B1 | 6/2010 | Hobbs et al. |
| 8,762,840 | B1 * | 6/2014 | Gouglev ............... G06F 3/0485 715/702 |
| 2003/0109286 | A1 | 6/2003 | Hack et al. |
| 2003/0144034 | A1 | 7/2003 | Hack et al. |
| 2005/0114504 | A1 | 5/2005 | Marolia et al. |
| 2009/0058822 | A1 | 3/2009 | Chaudhri |
| 2009/0059822 | A1 | 3/2009 | Morrill et al. |
| 2009/0284442 | A1 | 11/2009 | Pagan |
| 2010/0268762 | A1 | 10/2010 | Pahlavan et al. |
| 2010/0318695 | A1 | 12/2010 | Xing et al. |
| 2011/0202631 | A1 | 8/2011 | Berna Fornies et al. |
| 2012/0297016 | A1 | 11/2012 | Iyer et al. |
| 2013/0132856 | A1 | 5/2013 | Binyamin et al. |
| 2013/0227418 | A1 | 8/2013 | Sa et al. |
| 2014/0002376 | A1 * | 1/2014 | Oliver ................. G06F 3/04883 345/173 |
| 2015/0026586 | A1 | 1/2015 | Nylund et al. |

OTHER PUBLICATIONS

Extended European Search Report for EP Patent Application No. 12796423.7, dated Mar. 30, 2015.
Final Office Action for U.S. Appl. No. 13/492,803, dated Nov. 1, 2018.
Final Office Action for U.S. Appl. No. 13/492,803, dated Oct. 3, 2016.
Final Office Action for U.S. Appl. No. 13/492,803, dated Sep. 2, 2015.
International Search Report and Written Opinion for PCT/US2012/41772, dated Aug. 10, 2012.
Non-Final Office Action for U.S. Appl. No. 13/492,803, dated Apr. 23, 2018.
Non-Final Office Action for U.S. Appl. No. 13/492,803, dated Dec. 10, 2015.
Non-Final Office Action for U.S. Appl. No. 13/492,803, dated Jun. 13, 2016.
Non-Final Office Action for U.S. Appl. No. 13/492,803, dated Mar. 12, 2015.
Non-Final Office Action for U.S. Appl. No. 13/492,803, dated Sep. 7, 2017.
Notice of Allowance for U.S. Appl. No. 13/492,803, dated Mar. 7, 2019.
Second CN Office Action for CN Application No. 201280034077.X, dated Apr. 26, 2016.
Third CN Office Action for CN Application No. 201280034077.X, dated Oct. 27, 2016.
Weeks, "TeamViewer for iPhone", published Apr. 15, 2010, mymac.com, pp. 1-11.
Summons to Attend Oral Proceedings on EP Appl. No. 12796423.7 dated Feb. 11, 2021.

* cited by examiner

METHODS AND SYSTEM FOR LOCALLY GENERATED GESTURE AND TRANSITION GRAPHICS INTERACTION WITH TERMINAL CONTROL SERVICES

CROSS-REFERENCE TO RELATED APPLICATIONS

This patent application is a continuation of, and claims priority to and the benefit of U.S. patent application Ser. No. 13/492,803, titled "METHODS AND SYSTEM FOR LOCALLY GENERATED GESTURE AND TRANSITION GRAPHICS INTERACTION WITH TERMINAL CONTROL SERVICES," and filed Jun. 9, 2012, which is a continuation of, and claims priority to and the benefit of International Patent Application No. PCT/US2012/041772, titled "METHODS AND SYSTEM FOR LOCALLY GENERATED GESTURE AND TRANSITION GRAPHICS INTERACTION WITH TERMINAL CONTROL SERVICES," and filed Jun. 8, 2012, which claims priority to and the benefit of U.S. Provisional Patent Application No. 61/494,862, titled "METHODS AND SYSTEM FOR LOCALLY GENERATED GESTURE AND TRANSITION GRAPHICS INTERACTION WITH TERMINAL CONTROL SERVICES," and filed Jun. 8, 2011, the contents all of which are hereby incorporated herein by reference in its entirety for all purposes.

RELATED APPLICATION

This application is related to commonly owned U.S. patent application Ser. No. 12/784,454, filed May 20, 2010, entitled, "Methods for Interfacing with a Virtualized Computing Service over a Network using a Lightweight Client," and U.S. patent application Ser. No. 12/784,468, filed on May 20, 2010, entitled "Systems and Algorithm for Interfacing with a Virtualized Computing Service over a Network using a Lightweight Client," which are incorporated herein by reference in their entirety.

BACKGROUND

Field of the Invention

The present invention relates to enable content communication between a client device and a remote server device and more specifically enabling generation of transition graphics locally at the client device for content provided by the remote server device.

Description of the Related Art

With the advent and growing popularity of thin clients and smart terminals, various techniques have evolved to provide services on these devices. Techniques leveraging remote control services, such as Terminal Services, Application Publishing, Terminal Emulators, etc., are used to send image data to a terminal or thin client. The image data is rendered locally on the thin clients/terminals and commands/feedback from the terminals/thin clients are sent back to the underlying server-based Operating System (OS) for interpretation. As a result, any graphical interactions sent via the terminal protocol to the thin client/terminal are solely generated within the original OS. Although some interactions, such as local mouse rendering, are conducted locally, such interactions are limited in value.

With the rising popularity of shared services, more and more applications are moved into the "Cloud" for sharing. As more devices, such as tablets and smart-phones are generated and more applications related to terminal services are moved to the cloud, a rift has developed between the Cloud OS, which is predominantly classic Desktop based systems, and the default experience expected from the edge tablet/smart-phone devices. For instance, the smart-phone and tablet devices include features, such as transitions, swipe gestures, etc., while the cloud-based OS graphics are predominantly single page refreshes, videos, scrolling pages, etc.

One way of addressing the rift is to try and embed such transitions/gestures, etc., into the traditional desktop applications executing on the cloud OS. However, such endeavors have proven to be very costly from a development standpoint and network resource standpoint. For instance, all the transitions being generated at the cloud OS for the terminal services have to be transmitted over the network to the tablet/smart-phone devices, resulting in the transmission of huge burst of data leading to higher bandwidth usage. This means that every single pixel of screen data that changes/moves has to be transmitted from the cloud-based application to the terminal services at the edge devices (such as tablet, smart-phones, etc.).

It would be advantageous to minimize network resource usage while allowing the features designed for the edge devices to be executed without making changes to the application executing on the server. It would also be advantageous to allow transitions to occur locally at the edge devices while maintaining and serving the content from a central location. It would also be advantageous to separate client-server execution layer from user interaction layer so as to provide a more cost effective technique with minimal changes to the portion of the application executing on the cloud OS.

It is in this context, embodiments of the invention arise.

SUMMARY OF THE INVENTION

The embodiments of the invention provide methods and system for enabling locally generated transition graphics to interact with virtualized host computer service executing in the cloud. To provide an efficient technique for providing locally generated transition graphics, an application that was traditionally executing on the cloud is split into two elements—a client-side or edge-device application element and a server-side application element executing on the cloud OS. The client-side application is configured to provide low value data, local transitions and cached offline functionality while the server-side application is configured to provide high value transactions, secure data, high performance required data, etc. A communication interface is established between the client side application and the server-side application element. Specifically, a technique/application, such as a terminal services application, a virtual desktop application, etc., provides an interface to handle communication from the server-side application to the client-side application element and to a control system, such as gesture controls, at the local client device.

The various embodiments entertain requests from a user or application logic to change screens rendered on a display device of the client device. The application logic request is, in one embodiment, received from a server-side application executing on the server operating in the cloud. In another embodiment, the screen adjustment request is obtained through user interaction at the display device or at a display portion of the client-device. In response to the request, a communication is effectuated to the client-device that instructs the client-side application to execute a transitional effect that is to be tightly choreographed with the request to update and display the relevant portion of the changed screen at the display device of the client-device.

Several distinct embodiments are presented herein as examples.

In one embodiment, a processor-implemented method for enabling locally generated transition graphics to interact with virtualized host computer service, is disclosed. The method includes receiving a control command at a display device of a client device. The control command is issued by a user to control screen data currently being rendered at the display device. A desired screen effect for a gesture associated with the control command is identified at the client device. The control command, in the form of input command, is transmitted to the host computer service for processing. The control command is processed at the host computer service and updated screen data for the screen data currently being rendered at the display device is transmitted to the client device. The updated screen data is received at the client device. The updated screen data received from the host computer service is packaged with data, such as transition graphics that provides desired screen effect, associated with the desired gesture identified at the client device to generate a visual response at the client device. The packaged screen effect is returned to the display device for rendering, in response to the control command. The packaged screen effect includes the transition graphics that provide the visual response during rendering of the updated screen data.

In another embodiment, a processor-implemented method for enabling locally generated gestures and transition graphics to interact with virtualized host computer service, is disclosed. The method includes receiving a selection command at a display device of a client device. The selection command is issued by a user requesting an update to current screen data currently being rendered at the display device. The selection command is transmitted to a host computer service for processing. The host computer service processes the selection command and transmits updated screen data to the client device. In addition to the updated screen data, a desired gesture is identified at the server for the updated screen data and transmitted to the client with the updated screen data. The client device receives the updated screen data and the desired gesture that requires a visual response to be rendered with the updated screen data from the host computer service. The desired gesture dictates the adjustment to be made to screen data currently being rendered at the display device to include desired screen effect for the gesture. The client device identifies the desired screen effect that can provide a visual response for the gesture. The updated screen data is packaged, at the client device, with data associated with the desired screen effect that is used to generate visual response. The packaged data is returned to the display device for rendering, in response to the selection command. The rendering of the packaged data includes rendering of screen effect transitions related to the desired gesture during the rendering of the updated screen data.

In yet another embodiment, a system for enabling locally generated gestures and transition graphics interaction with virtualized host computer service, is disclosed. The system includes a server of the virtualized host computer service and a client device having a display device for rendering screen data. The server executes a server-side application that is configured to receive control command from a display device of the client device. The control command is issued by a user to control screen data currently being rendered at the display device. The server-side application is also configured to process the control command to identify updated screen data for returning to the client device for rendering. The client device executes a client-side application. The client-side application is configured to (a) interpret the control command obtained from the receiving device to identify a desired gesture associated with the control command; (b) transmit the gesture command to the server-side application for processing; (c) intercept the updated screen data transmitted from the server-side application to the display device; (d) retrieve current screen data that is being rendered currently at the display device; (e) generate packaged screen data by bundling the current screen data, the updated screen data and transition graphics providing desired screen effect to generate a visual response for the desired gesture; and (f) return the packaged screen data to the display device of the client device for rendering, wherein the packaged screen data includes transition graphics with the desired screen effect providing a transition from the current screen data to the updated screen data.

The invention will be readily understood by the following detailed description taken in conjunction with the accompanying drawings and claims.

BRIEF DESCRIPTION OF THE DRAWINGS

The present invention will be readily understood by the following detailed description in conjunction with the accompanying drawings.

DETAILED DESCRIPTION

Several exemplary embodiments for enabling locally generated gestures and transition graphics interaction with virtualized host computer service within a virtual environment will now be described. It will be apparent to those skilled in the art that the present invention may be practiced without some or all of the specific details set forth herein. Although the embodiments are extensively described with reference to a virtual environment, the teachings of the invention can be extended to a regular computing environment, such as client-server environment.

Figure 1:
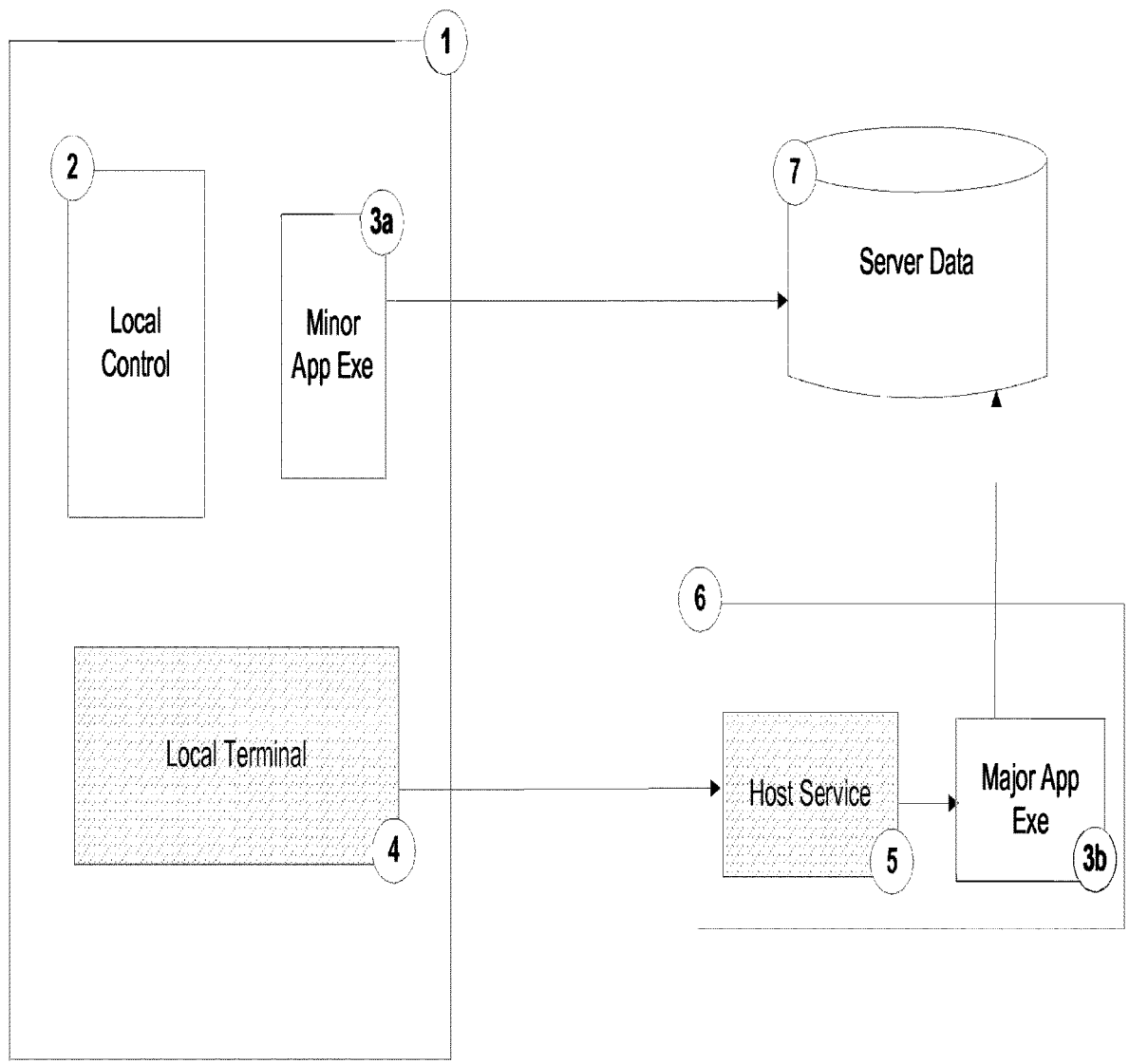
FIG. 1 illustrates a simplified block diagram identifying various modules and the interaction between the various modules within the system to enable communication of updated screen data and to provide locally generated gestures and transition graphics, in one embodiment of the invention.

The present invention defines methods and systems that enable generating gestures and transition graphics locally at a client device that interacts with virtualized host computer service in the cloud. FIG. 1 illustrates a simplified illustration of a system used in enabling locally generated gesture and transition graphics interaction with host computer services. The virtualized host computer service includes a server (1.6) executing a server-side application (1.3*b*) that is configured to process high value transactions that include high performance requirements, and to provide secure data. In one embodiment, the server may be executed on a virtual machine, such as a server virtual machine, executing Cloud OS. A portion of datacenter based application executes on the server virtual machine. In one embodiment, the datacenter based application includes two components. The first component provided on the server virtual machine is configured to perform the client-server processing and the second component is provided on the client device and is configured to perform user interaction processing. The first component, which is the server-side application (1.3*b*) executing on the server (1.6), does all the heavy-duty data processing. The server executes, in one embodiment, a cloud operating system (OS). The server-side application (1.3*b*) interacts with a client device (1.1) through a host service application interface (1.5). The server-side application (1.3*b*) also interacts with a database (1.7) on the server to obtain data for processing. The database (1.7) is also used by the client-device to store information related to gesture command.

The client device (1.1) is connected to the Internet using either wired or wireless connection. The client device (1.1) can take on any number of forms. Examples of client devices include computers, laptops, personal computers, tablet computing devices, mobile computing devices, such as tablet computing devices, smart-phones, personal digital assistants, or the like. The client device (1.1) engages the second component of the datacenter-based application, represented as client-side application element (1.3*a*), to perform local processing at the client device (1.1). The second component is configured to handle low value data, cached offline functionality, and to generate local transitions.

In one embodiment, a terminal services type of application (1.4) is provided in the client device (1.1) for communication between the client and the server devices. The terminal services application (1.4) provides a client-side interface between the client device (1.1) and the server (1.6). The terminal services application (1.4) at the client communicates with the server (1.6) through the host service application interface (1.5). The terminal services application also handles communication to and from a control system in the client device, such as gesture control system, with other components in the local client and the client-side application element. The result is a communication between the client-device and the host computer service where the client device provides a transitional effect that is choreographed tightly with the request to update and display relevant portion of the changed screen at the display device of the client device. In an alternate embodiment, virtual machine interface may be used in place of terminal services application to provide a client-side interface for communication between the client and the server devices.

The cloud OS is predominantly a classic Desktop based service that runs Windows™, Linux®, etc. OS. As a result, any data provided by the server executing cloud OS includes single page refreshes, page scrolling, video, etc., and do not have the animation features associated with gestures, such as page flipping, finger swipes, etc., that newer edge devices are configured to provide. The various embodiments described herein provide a way to integrate the newer functionalities, such as gestures, graphic transitions, that are available in the client edge devices, such as smart-phones, tablets, etc., with screen data received from remote applications executing on the host computer service, without having to modify the remote applications. Further, the gestures and transition graphics are provided at the local client device resulting in reduced load on the network resources as the network load handles just the updates/changes to the screen data and not the transition graphics. The transition graphics for the desired gesture identify the desired screen effect that provides a visual response at the display device during rendering of the updated screen data. This leads to optimal use of the network resources.

Other aspects of the invention will become apparent from the following detailed description, taken in conjunction with the accompanying drawings, illustrating by way of example the principles of the invention.

Figure 2A:
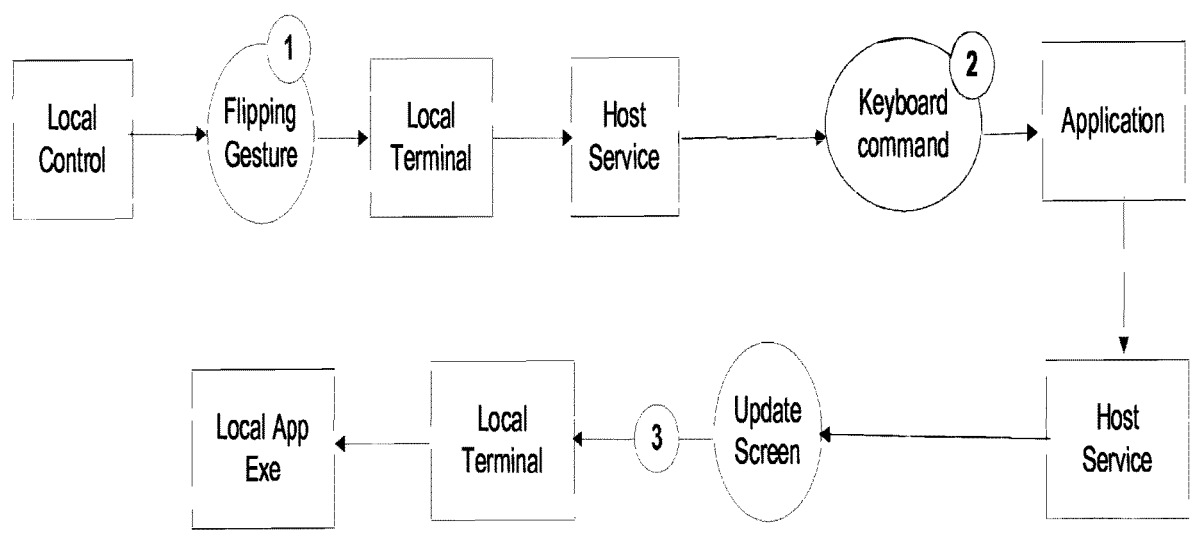
FIG. 2a identifies flow of information through the various modules and components of the system, in one embodiment of the invention.

FIG. 2*a* illustrates data flow sequence for updating a screen that requires a transitional event. In one embodiment, a user interaction received at a display device triggers a request to update a screen rendered at the display-device of the client-device. In one embodiment, the user interaction is in the form of a control command (2*a*.1), such as a page down, page up, swipe left, swipe right, etc., issued by a user for controlling screen data currently being rendered at the display device. The control command identifies the desired gesture specified by the user by referring to a mapping table that is maintained at the client device. The mapping table maps the various control commands to different gestures defined by keyboard and mouse commands. More details about identifying the desired gesture will be described with reference to FIG. 3*a*. The desired gesture command is then transmitted by the local terminal as input commands (i.e. keyboard/mouse commands) through a backchannel service to host service for processing.

The host service application interfacing with the local terminal service application receives the gesture command in the form of input commands from the client-device (2*a*.2), and sends the input commands to the server-side application. The server-side application processes the input command to identify appropriate application workload as screen update data. In one embodiment, the server-side application may query the server database available to the server (i.e. host application service) to obtain the workload related to the screen update.

The screen update workload (i.e. data) is packaged and returned to the display device of client device for local rendering. The packaged screen update is configured to draw the screen update in the workload as a single update. Additionally, the packaged screen update includes a request to the local application on the client device (i.e. client-side application) to generate transitional data for executing a transition when rendering the updated screen data, based on the control command. The transitional data identifies a desired screen effect that generates a visual response at the display device of the client device.

The client-side application intercepts the packaged screen update and choreographs transitions for the screen update. The client-side application identifies one or more transition graphics (i.e. screen effects) for implementing the desired gesture. It should be noted that the transition graphics can vary by technique used in implementing the gesture and by the client device. Irrespective of the technique or the client device used, the client-side application will recognize the updated screen data received in packaged screen update, and integrate the transition graphics with the updated screen data.

In one embodiment, the client-side application stores screen data that is currently being rendered on the display device of the client-device, in a first local buffer in the client-device. The client-side application also receives the packaged screen data into a second local buffer within the client-device for further processing. In one embodiment, upon receipt of the packaged screen data, the client-side application retrieves the current screen data from the first local buffer and the packaged screen data from the second buffer and generates the required transition graphics locally at the client-device. In one embodiment, the client-side application identifies the different frames of the current and updated screen data, and integrates the transition graphics at the client-device between a last frame of the current screen data and a first frame of the updated screen data. The transition graphics provides the desired screen effect that blends the old and the new frames together during rendering while providing animation transition. Some examples of transition graphics that are integrated include cross dissolves, magazine page flipping animation, simple replace, etc.

The above technique of integrating the transition graphics between the old and the new screen data works not only for an entire page refresh but also for refreshing small portal window where a transition effect that is more suitable for small areas can be deployed using same or similar technique.

Figure 2B:
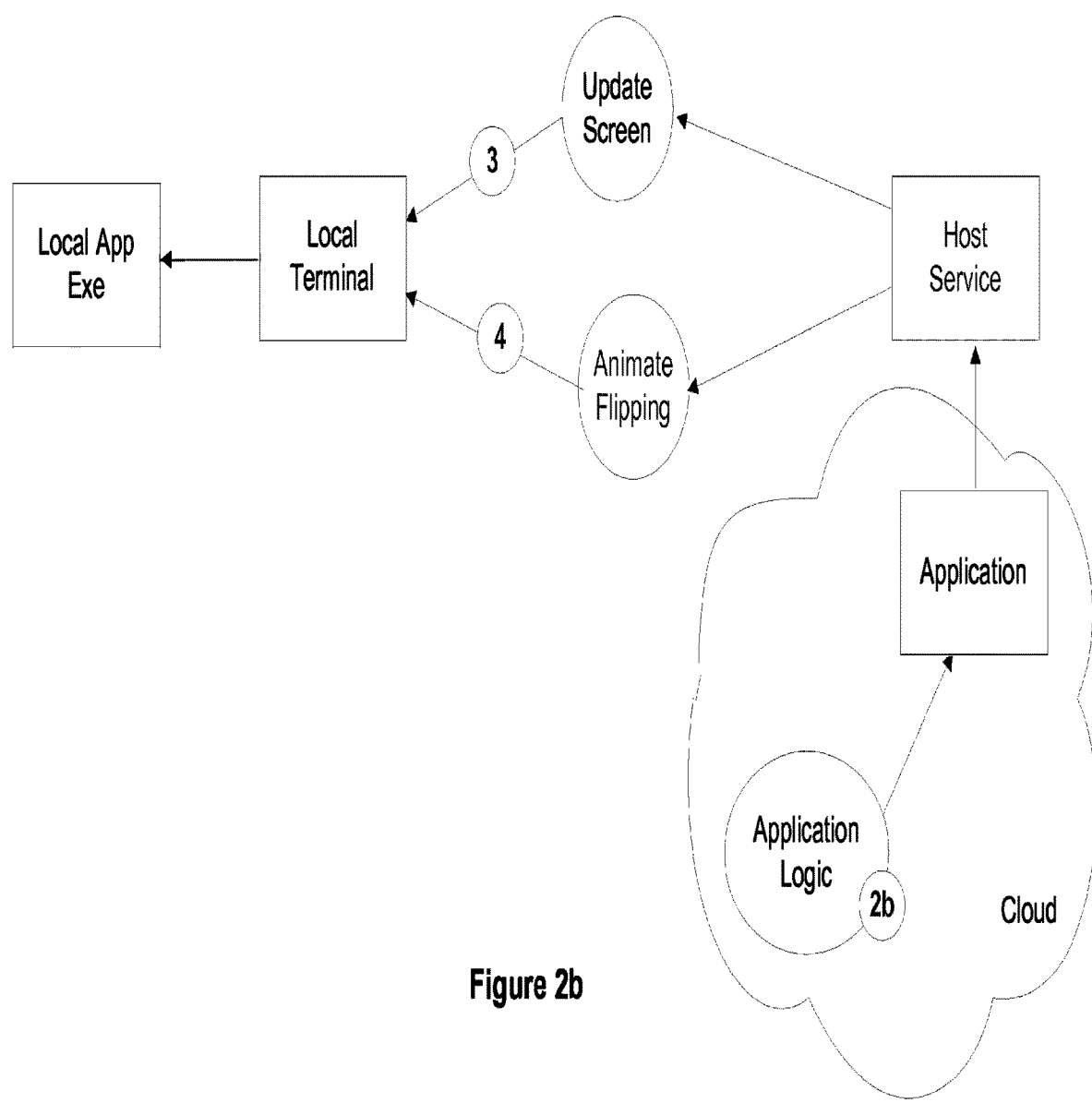
FIG. 2b identifies flow of information through the various modules and components of the system, in an alternate embodiment of the invention.

In another embodiment illustrated in FIG. 2b, an external business logic (2b.2b) may trigger a request to provide transition graphics during whole screen or partial screen refresh. This embodiment differs from the embodiment illustrated in FIG. 2a in the way the transition request is received. In FIG. 2a the request for screen refresh request is provided as control command through user interaction, whereas in the embodiment in FIG. 2b, the screen refresh request is provided by an external business logic embedded in an external application. In one embodiment, the external application is executing on a server in the Cloud executing the cloud OS. The screen refresh request triggered by the external application is forwarded to the host service on the server for processing. The server-side application executing in the host service identifies the request and interacts with a server-side database to obtain update screen data (2b.3) for the request. The server-side application, in this embodiment, also identifies a gesture (2b.4) command that the application desires to be integrated with the updated screen data so as to generate a visual response when rendered at the display-device of the client-device. In this embodiment, a mapping table is maintained on the server, mapping the controls to gestures. The server-side application refers to the mapping table to identify the desired gesture. The server-side application packages the updated screen data and the desired gesture to generate packaged screen data and transmits the packaged screen data to the client-device for rendering. As mentioned with reference to FIG. 2a, the client-device intercepts the packaged screen data, identifies the transition graphics for providing desired screen effect for the identified gesture received with the packaged screen data and incorporates the transition graphics in the appropriate place so as to generate a visual response when the updated screen data is rendered at the client device. In one embodiment, the desired animation blends the currently rendered screen data with the updated screen data by integrating the transition graphics between the frames of the currently rendered screen data and the updated screen data. In another embodiment, the desired animation is presented prior to, during or after the rendering of the updated screen data.

Conventional application can be viewed as an interaction between a client system and an application execution system. In the conventional system, a control command is captured at the client-device and interpreted to identify input commands, such as keyboard/mouse commands. The input commands are transmitted to a datacenter-based application executing on a server in the Cloud. The datacenter-based application is predominantly classic Desktop based application that is devoid of any animations. The server processes the request, identifies updated screen data and forwards the updated screen data directly to the display device for rendering. The updated screen data is rendered on the display device as single page refreshes or scrolling or video depending on the type of data that is currently rendering on the display device. The various embodiments of the current invention, on the other hand, provide ways to intercept the updated screen data that is directed toward the display device, and modify the updated screen data to include desired transition graphics at the client device and returning the modified screen data to the display device. The modified screen data includes screen effect features that may generally not be available to the application in the server device but may be available at the client device.

Figures 3A, 3B:
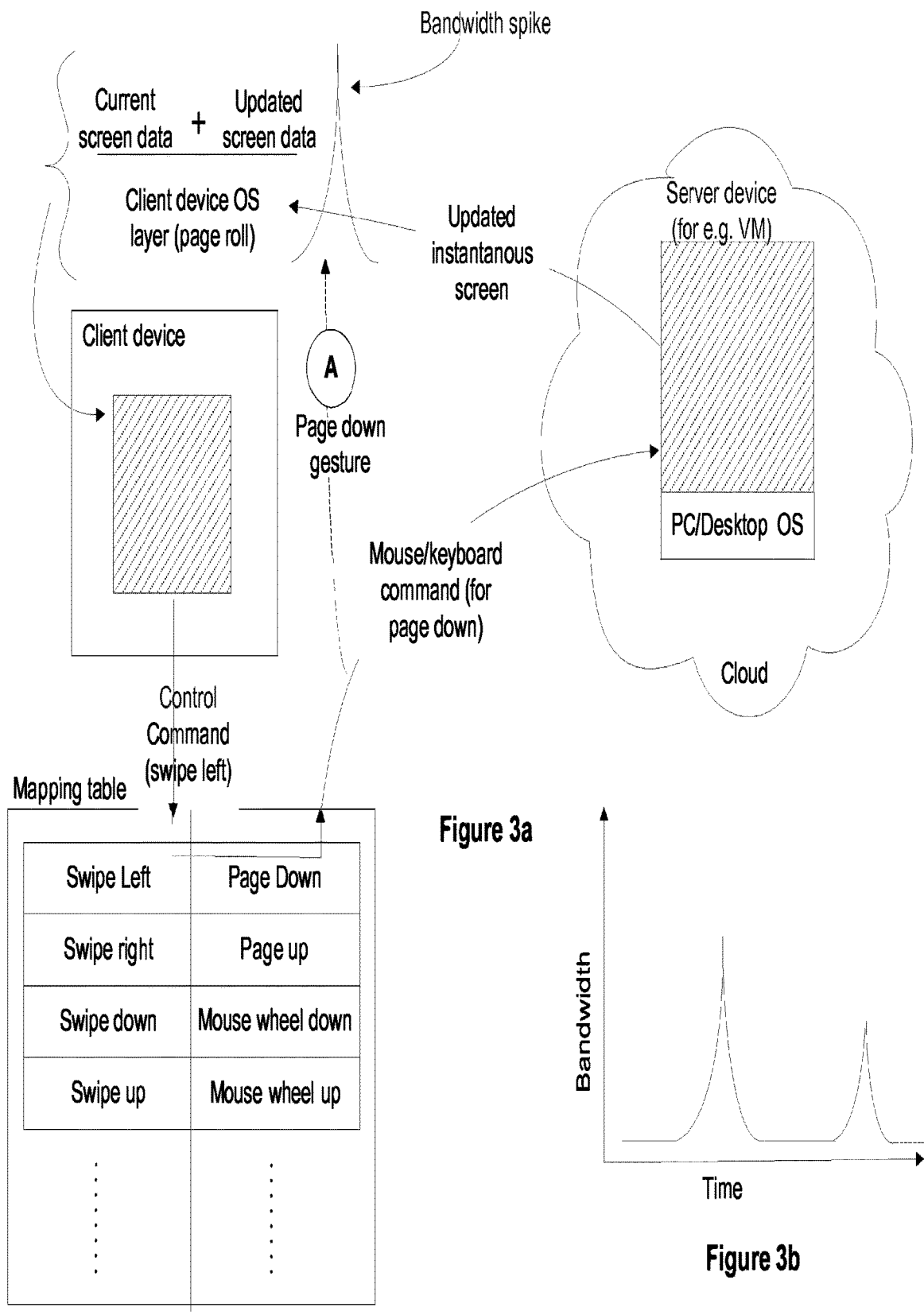
FIG. 3a illustrates the process followed to update screen data at the client, in one embodiment of the invention.
FIG. 3b illustrates data distribution over time during transmission of screen data updates, in one embodiment of the invention.

FIG. 3a illustrates the process used in providing transition graphics interaction with terminal control services, in one embodiment of the invention. A display device of a client-device is used to render current screen data. A user interaction at the display device is captured by a client-side application. The user interaction is received as a control command that controls screen data currently being rendering on the display device. In one embodiment, the control command is interpreted by the client-side application using a mapping table maintained at the client-device. The mapping table maps the control commands to desired gestures. For instance, a "swipe left" command may be mapped to a "page down" gesture, a "swipe right" command may be mapped to "page up" gesture, a "swipe up" may be mapped to "mouse wheel up" gesture, a "swipe down" command may be mapped to "mouse wheel down" gesture, etc. The mapping table in FIG. 3a illustrates a sampling of the control commands that are mapped to some gestures.

The control command is interpreted to identify the desired gesture command, in the form of input commands, and the input commands (keyboard/mouse commands) are transmitted to the server-side application through the respective interfaces in the client and the server devices. The server-side application identifies the updated screen data that is associated with the gesture command and transmits the updated screen data as new instantaneous screen data to be rendered at the display device. In one embodiment, the updated screen data is identified and provided as framebuffer data. For more information on obtaining framebuffer data for refreshing screen data on a display device of a client device, reference can be made to commonly owned U.S. patent application Ser. No. 12/784,454, filed May 20, 2010, entitled, "Methods for Interfacing with a Virtualized Computing Service over a Network using a Lightweight Client," and U.S. patent application Ser. No. 12/784,468, filed on May 20, 2010, entitled "Systems and Algorithm for Interfacing with a Virtualized Computing Service over a Network using a Lightweight Client," which are incorporated herein by reference in their entirety.

The transmission of the updated screen data from the server to the client device is identified by a spike in bandwidth data over a short period of time, as illustrated in FIG. 3b. The Operating system (OS) of the client-device detects the burst in transmission data coming over the network and holds off rendering updated screen data at the display device of the client-device. Instead, the client device OS intercepts the new updated instantaneous screen data directed to the display device and, forwards the same to the client-side application for processing. In one embodiment, the client device OS, upon interception, stores the updated screen data in a local buffer. In this embodiment, the client device OS then sends a signal to the client-side application to indicate new data available for processing. In another embodiment, the client device OS forwards the updated screen data to the client-side application directly for processing without storing in a local buffer. The client device OS knows to wait for the client-side application to process the updated screen data prior to rendering at the display device. The time period for waiting may be equivalent to the time taken for the transmission of the updated screen data. In one embodiment, the client device OS issues a wait command for the time period that is equivalent to the time taken for transmission of the updated screen data from the server device.

Upon receiving the updated screen data forwarded by the client device OS, the client-side application, in one embodiment, queries and retrieves current screen data that is being currently rendered at the display device from a local buffer where it is stored during rendering at the display device. In one embodiment, the local buffer used for storing the current screen data is distinct from the local buffer storing the updated screen data. In another embodiment, the current screen data and the updated screen data may be stored distinctly within a common local buffer.

The client-side application also identifies transition graphics that need to be included so as to provide screen transition effect for the desired gesture when rendering the updated screen data. This operation is indicated by arrow 'A' in FIG. 3a. The transition graphics are identified based on the gesture commands provided in the user interaction. The client-side application bundles the retrieved current screen data with the updated screen data and the transition graphics for providing the screen effect and forwards the bundled screen data to the client device OS. In one embodiment, the client device OS converts a simple control command such as a 'page down' into a book by allowing the transition graphics to be embedded between last frame of the current screen data and first frame of the updated screen data so as to provide the desired transition effect that generates a visual response between the currently rendered screen data and the newly requested updated screen data. This is different from the traditional approach where a page-up command would be interpreted by the server's Desktop OS to mean previous page and the updated screen data will include the previous page data that is returned directly to the display device for rendering without any animation graphics. The interception, interpretations, and integration of transition graphics are all done locally at the client device. Using the aforementioned approach, the client-side application can provide the ability to incorporate newer features as and when they are developed/available at the client device so as to enable rendering of the data that incorporates these features that are not normally available in the server application. There is no need to modify the application on the server to provide these new features. Rather, all the transition animations, in one embodiment, can be provided at the client device by updating the mapping table maintained at the client device and the client-side application, if need be.

In one embodiment, a new server-side application may be generated for processing user interactions at the display device on the client device. The server-side application will identify the necessary gesture commands that need to be included with the updated screen data that is transmitted to the client device. The gesture commands are interpreted by the client-side application to define the desired transitions using the mapping table maintained at the client device. The gesture command is processed by the client-side OS to provide the required transition graphics so as to provide the screen transition effect during rendering of the screen update at the display device. The screen transition effects generate a visual response when rendered at the client device that is appropriate for the desired gesture identified from the control command. It should be noted that in the aforementioned embodiments, the interpretation of the gesture commands and the rendering of appropriate transition graphics are done in substantial real-time.

Thus, the current embodiments define methods that allow splitting of the data and analytic application service from the user interactive and immersive techniques allowing the native-like client device interfaces to layer in on top of conventional cloud based applications so as to enable incorporation of the new features available at the client device with the screen data that is rendered at the display device of the client device. In other words, the server-side application is allowed to handle the client-server processing and the client-side application is designed to handle user interface processing including local transitions that provide the screen transition effect at the display device.

Figure 4:
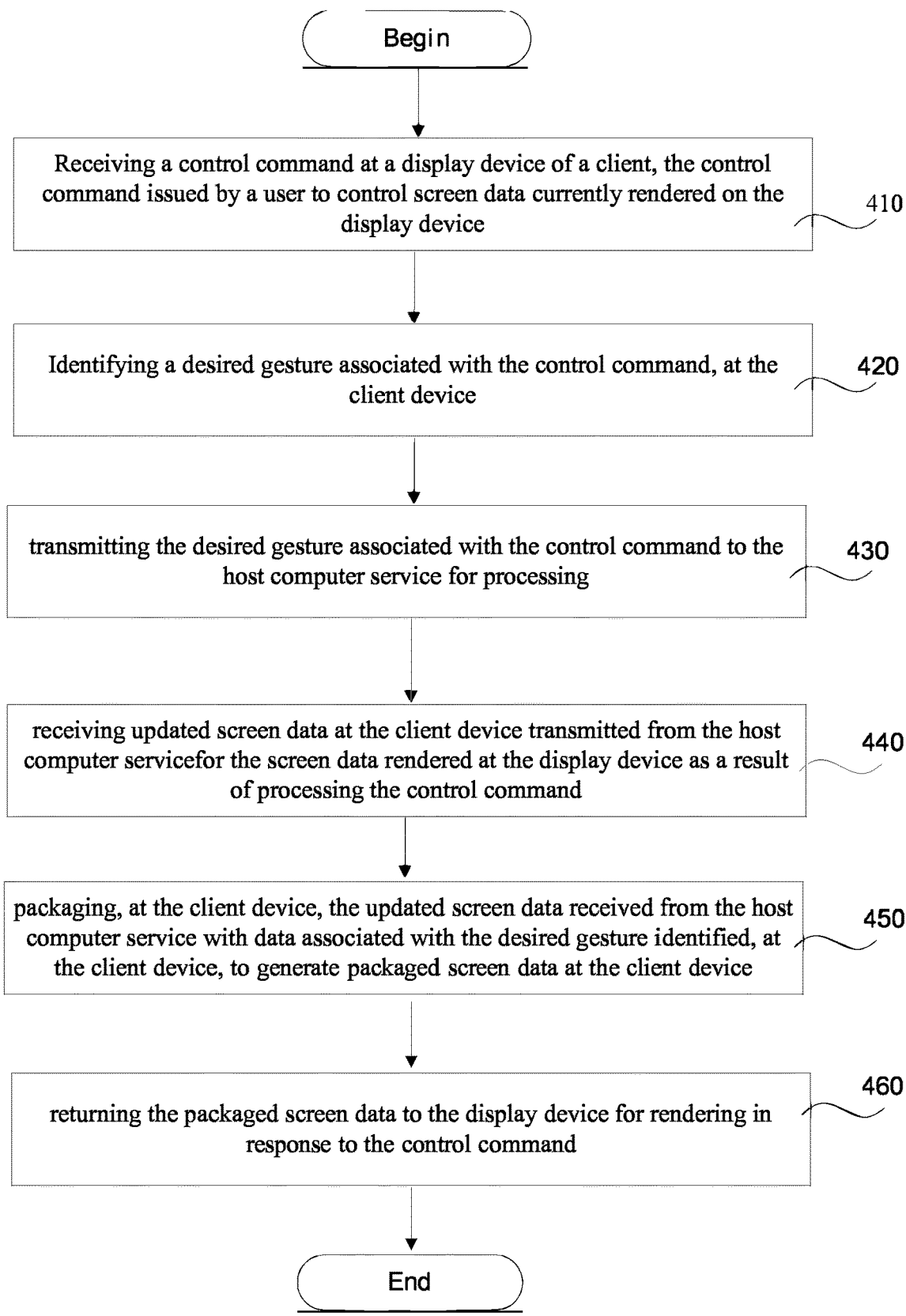
FIG. 4 illustrates a process flow diagram of various steps involved for enabling locally generated gestures and transition graphics interaction with virtualized host computer service, in one embodiment of the invention.

FIG. 4 illustrates a process flow for a method for enabling locally generated transition graphics to interact with virtualized host computer service, in one embodiment. The method begins at operation 410, wherein a control command is received at a display device or a display portion of a client device. The control command may be provided by user interaction at the display device, wherein the user interaction is designed to control screen data rendered thereon. For instance, the user interaction may include a finger swipe to the left, right, up or down, a finger touch/tap, etc., on the display device while current screen data is being rendered on the display device. The user interaction is captured and interpreted by the client-side application to identify gesture command. The gesture command in the form of input command, such as keyboard/mouse command, is transmitted to the host computer service for processing, as illustrated in operation 420. The gesture command is processed at a server-side application within the host computer service and appropriate update screen data is identified, as illustrated in operation 430. The server-side application may access the server-side database to identify and retrieve the appropriate screen data to be transmitted to the client device as updates based on the gesture command received from the client-device. The identified screen data is returned to the client device in response to the gesture command.

The operating system of the client device receives and intercepts the updated screen data that is directed to the display device and hands over the updated screen data to the client-side application for further processing, as illustrated in operation 440. In one embodiment, the client device OS stores the updated screen data in a local buffer (i.e. second local buffer) and sends a signal to the client-side application. In response to the received signal, the client-side application retrieves current screen data that is currently being rendered at the display device and stored in a first local buffer and the updated screen data from a second local buffer and bundles the two screen data together with desired transition graphics and forwards the bundled screen data to the client device OS. As mentioned earlier, the local buffer storing the current screen data may be distinct from the local buffer that is used to store the updated screen data. In another embodiment, a single local buffer is used to store both the current screen data and the updated screen data. In this embodiment, the two screen data are stored distinctly within the common local buffer.

The client device OS receives the bundled screen data with the transition graphics that provide the required screen transition effect for the desired gesture between the old screen data (i.e. current screen data) and the new screen data (i.e. updated screen data) so as to generate a visual response at the display device when the screen data is rendered. In order to effectuate the desired animation between the current and the updated screen data, the client device OS identifies the last frame of the current screen data and the first frame of the updated screen data. The client device OS then incorporates the transition graphics between the last frame of the current screen data and the first frame of the update screen data and generates a packaged screen data that contains the current screen data, the updated screen data and the transition graphics incorporated in-between, as illustrated in operation 450. The packaged screen data with the desired screen effect is returned to the display device for rendering, as illustrated in operation 460. The rendered transition graphics generates the visual response that blends the old application functionality with the new features available at the edge devices, such as edge tablet, smart-phone, etc., without having to modify the old application executing on the server.

Figure 5:
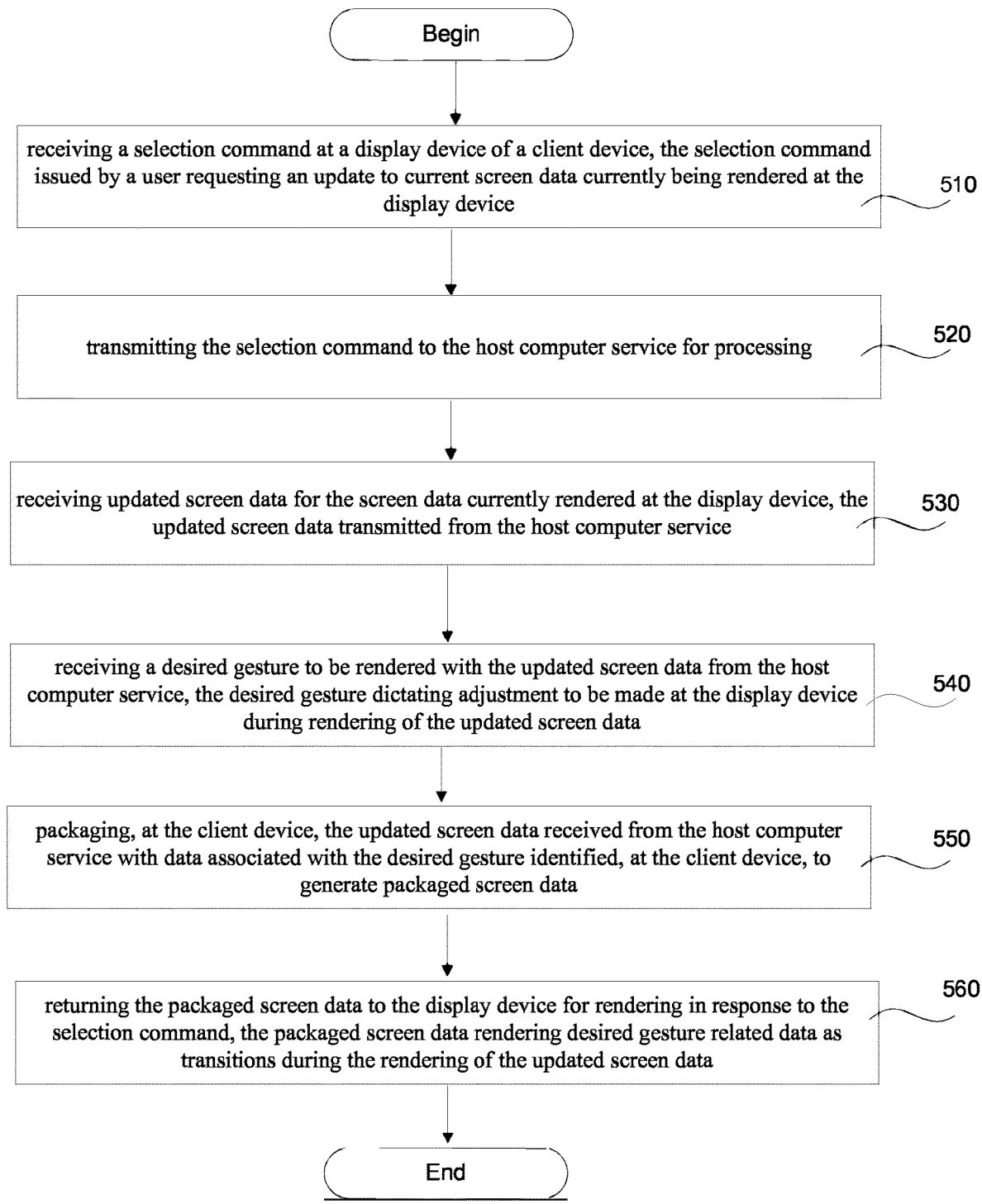
FIG. 5 illustrates a process flow diagram of various steps involved for enabling locally generated gestures and transition graphics interaction with virtualized host computer service, in an alternate embodiment of the invention.

FIG. 5 illustrates an alternate method for enabling locally generated transition graphics interaction with virtualized host computer service, in another embodiment of the invention. The method begins at operation 510, wherein a selection command is received at a display device of a client device. The selection command is received from a user at the display device wherein the user selects an available option on a screen rendered at the display device. The selection command is transmitted to the host computer service for processing, as illustrated in operation 520. The selection command is processed by the server-side application to identify screen data that satisfies the selection command. In addition, the server-side application identifies a desired gesture for rendering with the identified screen data. The server-side application returns the updated screen data, as illustrated in operation 530 and the desired gesture to the client-device for rendering on a display device of the client-device, as illustrated in operation 540. The desired gesture may be identified using a mapping table maintained at the server device. The desired gesture dictates adjustments to be made at the display device during rendering of the updated screen data.

The client device OS intercepts the updated screen data and the desired gesture that identifies desired screen effect to be included during rendering of the updated screen data returned by the server and hands the data and the desired gesture to the client-side application for processing. The client-side application, in response to receiving the data from the client device OS, identifies the transition graphics (i.e. desired screen effect) corresponding to the desired gesture that are suitable for the updated screen data and incorporates the transition graphics information with the updated screen data and generates a packaged screen data that includes the transition graphics for the desired gesture, as illustrated in operation 550.

The client device OS receives the packaged updated screen data with the transition graphics and returns the packaged screen data for rendering at the display device, as illustrated in operation 560. The rendering of the packaged screen data includes the updated screen data with the desired transition graphics. The transition graphics generates a visual response during rendering of the updated screen data, thereby enriching a user's interaction experience at the display device.

The various embodiments described herein teach a technique that allows transitions to be generated locally at the client device while enabling the content for rendering to be centrally served. The embodiments describe a choreography between the client device and the display device (i.e. terminal) to handle the transitions in real-time. The transition choreography is done at the client side with the updated screen data received from the server side. This form of local choreography reduces the strain on the network resources while providing the ability to exploit newer user interface design features available within the newer edge devices.

The screen data of the various embodiments described herein may be in the form of framebuffer data that uses framebuffer handling techniques, which optimize the pre-sentation of data processed or pre-processed by a remote host computer service. In one embodiment, the remote computer device may be a virtual machine that is processing data or applications, and is generating screen data that is used for display on a rendering device, such as a display device of a client device. Some of the client devices used in the various embodiments described herein include desktop computer, laptop computer, tablet, smart-phone, thin or fat terminal devices, or other computing devices. For more information describing handling of framebuffer data, reference may be made to application Ser. No. 12/784,454, filed on May 20, 2010, entitled "Methods for Interfacing with a Virtualized Computing Service over a Network using a Lightweight Client," and application Ser. No. 12/784,468, filed on May 20, 2010, entitled "Systems and Algorithm for Interfacing with a Virtualized Computing Service over a Network using a Lightweight Client," which are incorporated herein by reference.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes or it may be a general-purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be obvious, however, to one skilled in the art, that the present invention may be practiced without some or all of these specific details. In other instances, well known process operations have not been described in detail in order not to unnecessarily obscure the present invention.

Although the foregoing invention has been described in some detail for purposes of clarity of understanding, it will be apparent that certain changes and modifications can be practiced within the scope of the invention. Accordingly, the present embodiments are to be considered as illustrative and not restrictive, and the invention is not to be limited to the details given herein, but may be modified within the scope of the invention.

What is claimed is:

1. A method comprising:
   receiving, by a client, a control command responsive to a user interaction via a display, the user interaction comprising a gesture;
   identifying, by the client, the gesture and transition graphics based at least on the control command, wherein the transition graphics are configured to provide a screen transition effect for rendering updated screen data on the display;
   receiving, by the client, updated screen data from a server responsive to communicating the control command and the gesture to the server;
   embedding, by the client, the transition graphics between a currently rendered screen data and updated screen data so as to provide the screen transition effect between the currently rendered screen data and the updated screen data; and
   rendering, by the client responsive to the user interaction via the display, the transition graphics and the updated screen data.

2. The method of claim 1, wherein the transition graphics comprises one of the following: cross dissolves, magazine page flipping animation and a replace.

3. The method of claim 1, wherein the screen transition effect is configured to provide a visual response between the currently rendered screen data and the updated screen data.

4. The method of claim 1, further comprising packaging, at the client responsive to receiving the updated screen data, the updated screen data with the transition graphics generated at the client for the gesture to generate packaged screen data at the client.

5. The method of claim 4, further comprising rendering, by the client, the packaged screen data via the display.

6. The method of claim 1, further comprising identifying, by the client, a last frame for the currently rendered screen data and a first frame for the updated screen data.

7. The method of claim 6, further comprising embedding, by the client, the transition graphics between the last frame and the first frame.

8. The method of claim 1, further comprising using, by one of the client or the server, the control command to identify the gesture via a mapping table.

9. The method of claim 1, wherein the server comprises a hosted service executing an application.

10. The method of claim 1, wherein the client comprises one of a client-side application or an application component of an application executing on the server.

11. A system comprising:
    a client comprising one or more processors, coupled to memory and configured to:
    receive a control command responsive to a user interaction via a display, the user interaction comprising a gesture;
    identify the gesture and transition graphics based at least on the control command, wherein the transition graphics are configured to provide a screen transition effect for rendering updated screen data on the client;
    receive updated screen data from a server responsive to communicating the control command and the gesture to the server;
    embed the transition graphics between a currently rendered screen data and updated screen data so as to provide the screen transition effect between the currently rendered screen data and the updated screen data; and
    render, responsive to the user interaction via the display, the transition graphics and the updated screen data.

12. The system of claim 11, wherein the transition graphics comprises one of the following: cross dissolves, magazine page flipping animation and a replace.

13. The system of claim 11, wherein the screen transition effect is configured to provide a visual response between the currently rendered screen data and the updated screen data.

14. The system of claim 11, wherein the client is further configured to package, responsive to receiving the updated screen data, the updated screen data with transition graphics generated at the client for the gesture to generate packaged screen data at the client.

15. The system of claim 14, wherein the client is further configured to render the packaged screen data via the display.

16. The system of claim 11, wherein the client is further configured to identify a last frame for the currently rendered screen data and a first frame for the updated screen data.

17. The system of claim 16, wherein the client is further configured to embed the transition graphics between the last frame and the first frame.

18. The system of claim 11, wherein of the client or the server is further configured to use the control command to identify the gesture via a mapping table.

19. The system of claim 11, wherein the server comprises a hosted service executing an application.

20. The system of claim 11, wherein the client further comprises one of a client-side application or an application component of an application executing on the server.

* * * * *